Figure 1:
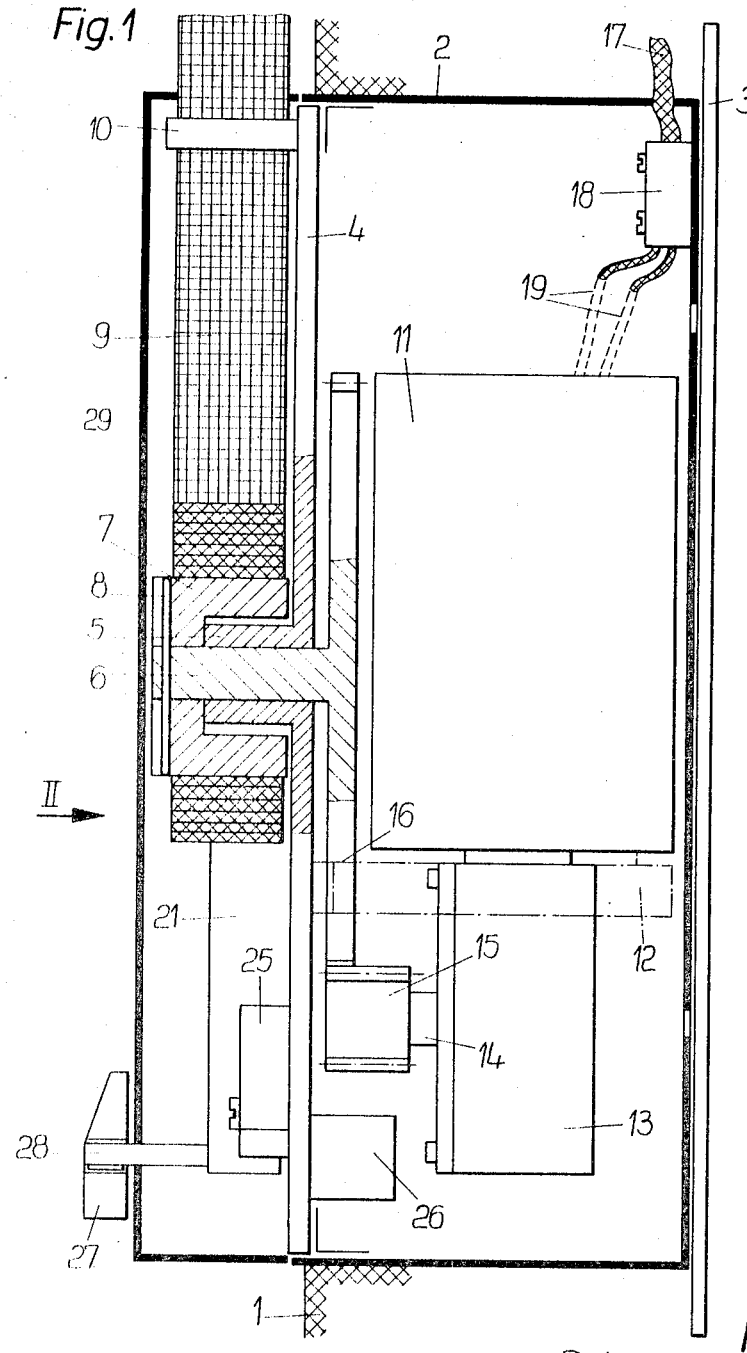

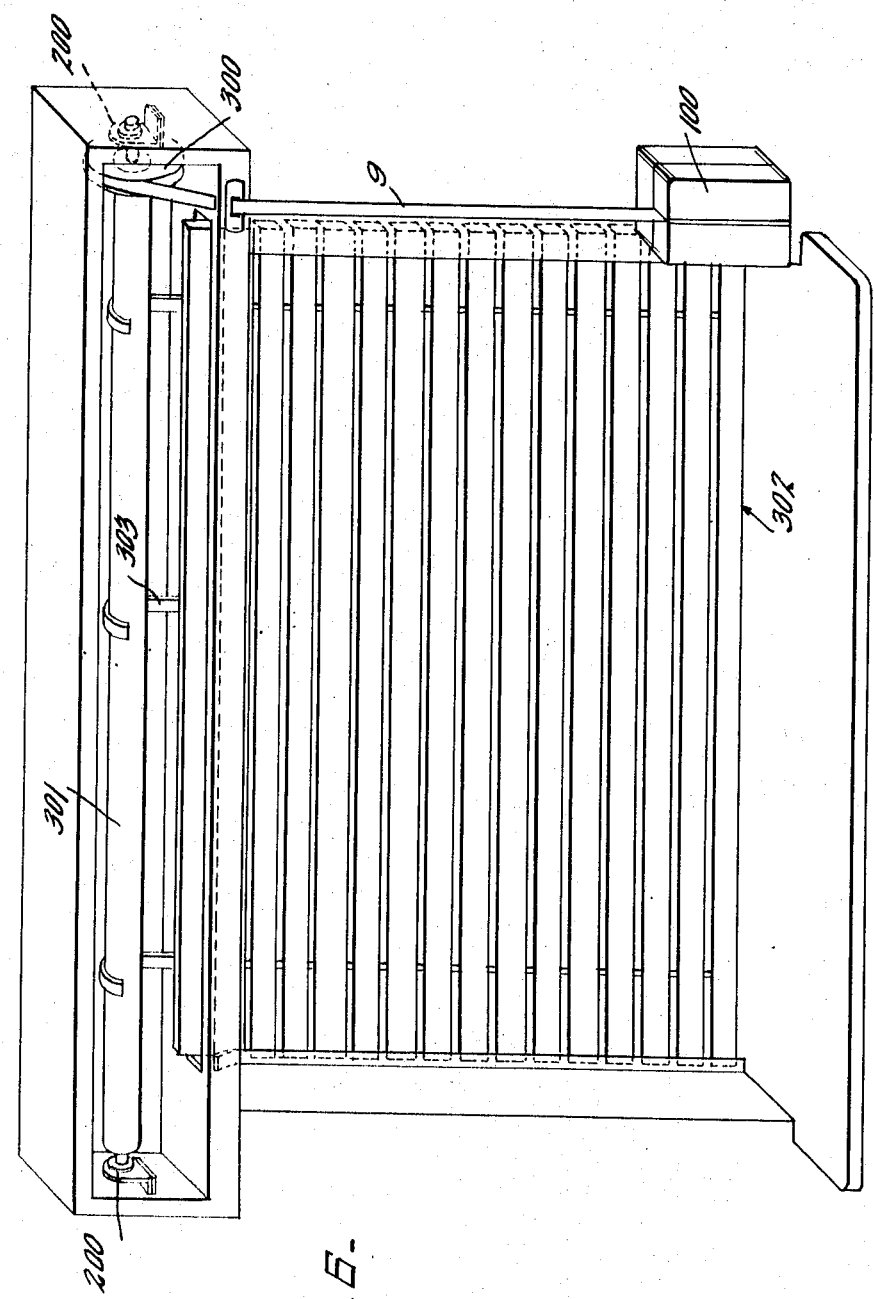

United States Patent Office 3,355,149
Patented Nov. 28, 1967

3,355,149
APPARATUS FOR RAISING AND LOWERING BLINDS
Hans Wiegelmann, Hardtstrasse, Helmut Germann, Im Triesch 3, and Peter Cherubin, Hardtstrasse, all of Sinn, Germany
Filed Dec. 6, 1965, Ser. No. 511,911
Claims priority, application Germany, Dec. 10, 1964, B 79,684; Apr. 10, 1965, B 81,397
12 Claims. (Cl. 254—173)

The invention relates to apparatus for raising and lowering blinds of the kind which are wound on to a rotatable cylinder, such as roller blinds and venetian blinds.

In known electrically driven apparatus for raising and lowering roller blinds, etc., the drive mechanism is disposed in proximity to the cylinder. The cylinder is always fitted at the top of the blind, so that access to the drive mechanism is difficult. Any installation of such an electrically driven apparatus in place of a manually operated blind necessitates extensive work, generally including masonry work, since the space required for a cylinder connected to an electric drive mechanism is generally substantially greater than the space required for the cylinder of a manually operated blind. In the case of faults in the electrical drive mechanism, it is no longer possible to operate the roller blind, and like wise in the case of failure of the current supplying the electric drive motor. Repairs are complicated because access to the drive mechanism is difficult.

It is an object of the present invention to provide apparatus for raising and lowering blinds of the kind which are wound on to a rotatable cylinder, which apparatus can easily be installed to operate an existing blind and which is easy to repair in the case of faults.

The invention provides apparatus for raising and lowering a blind of the kind which is wound on to a rotatable cylinder, comprising a rotatable winding element for mounting remotely from the cylinder, an electric motor connected to the winding element, and a flexible driving element extending between the cylinder and the winding element and which is wound on to the winding element so as to cause rotation of the cylinder when the electric motor is operated.

Such apparatus disposed remotely from the cylinder can be fitted in places where access to the apparatus is easy. It is also possible to fit such apparatus subsequently to an already existing blind.

Advantageously, the motor and the winding element are disposed beneath the blind cylinder, preferably at the place where the accumulator roller would be fitted in the case of manually operated roller blinds, and the flexible driving element is a strap of such dimensions as is used for working manually-operated blinds. With such an arrangement of the apparatus according to the invention, installation where a manually operated blind already exists is easily possible. Modifications to the cylinder are totally unnecessary. All that is necessary is to fit the electrically operated apparatus, according to the invention, instead of the accumulator roller used in the case of manual operation. Such a conversion can be performed rapidly and with simple means, since at the place where the accumulator roller was arranged there is usually sufficient space available, and any necessary masonry work can be performed at convenient working height—i.e., without using a ladder or a scaffold.

The motor and the winding cylinder are advantageously at least partly accommodated in a wall chest let into the wall, and are thus at most partially visible from the exterior. Alternatively, the entire apparatus may also be accommodated in a chest secured on the wall. This latter construction calls for no masonry work, and is in many cases equally convenient to the construction having an inlet wall chest.

The motor and the winding element are conveniently mounted on a baseplate which can be secured within the wall chest after the latter has been installed. The empty wall chest is first inserted into the wall and only then is the baseplate carrying the motor and winding element screwed on.

The drive motor used is conveniently a reversible electric motor.

Where such a motor is used, special transmission means to achieve reversal of the direction of rotation of the motor are not required.

Apparatus according to the present invention preferably comprises a self-locking transmission, e.g. a self-locking worm gear connecting the winding element to the electric motor. When such a self-locking transmission is used, no special brake devices are necessary, because when the motor is switched off, the blind cylinder is automatically stopped and held.

The transmission may include a worm mounted on the motor shaft, a worm wheel mounted on a second shaft and meshing with the worm, a pinion mounted on said second shaft, and a gear wheel connected to the winding element, the gear wheel meshing with the pinion. It is possible, with such a construction, to achieve a very high transmission ratio, e.g., a transmission ratio of 1:250. This makes it possible to use a high speed electric motor, e.g. with a speed of 7500 revolutions per minute, and hence a motor of correspondingly smaller dimensions.

Apparatus according to the invention may further include a drive shaft on which the winding element is mounted, and detachable means for connecting the winding element with the drive shaft so as to allow manual rotation of the winding element independently of the motor. This permits a simple conversion to manual operation in case a fault should occur, e.g. failure of the current.

Apparatus according to the present invention may also comprise an electrical control circuit for the motor, which control circuit includes a microswitch, and sensing means which senses the amount of the flexible driving element wound on the winding element, the sensing means being operatively associated with the microswitch to actuate the microswitch, thereby stopping the motor, when the blind reaches a predetermined position.

Preferably the control circuit includes two microswitches for switching off the electric motor, and the sensing means is operable to actuate one of the microswitches when a predetermined minimum length of the flexible driving element is wound on the winding element, and to actuate the other microswitch when a predetermined maximum length of the flexible driving element is wound on the winding element.

In one embodiment of the invention, the flexible driving element is a strap which is spirally wound on the winding element, and the sensing means is a lever which is urged resiliently against the part of the strap wound on the winding element, and each said microswitch is located at a predetermined position relative to the sensing lever, being slidable on a bar to which it can be locked. The greater the length of strap wound up on the winding element, the farther is the sensing lever deflected. When such a length of strap has been wound up that the roller blind has reached its raised position, then the sensing lever reaches one of the microswitches and actuates the latter. Where a second microswitch is provided, this may be similarly actuated when the strap bobbin has its minimum diameter. The sensing lever device is especially sensitive when each microswitch is arranged in the path of movement of the outermost end of the sensing lever.

Another embodiment of the invention comprises two microswitches for switching off the motor, respective actuating means for each microswitch, and two irregularities or magnets so positioned on the flexible driving element, as to be sensed by and to operate the respective actuating means when the blind is fully raised and when the blind is fully lowered. When one of the said irregularities or magnets enters the region of a microswitch, the latter is actuated either mechanically or magnetically.

Apparatus according to the invention may further comprise, in the case where the microswitches are operated by irregularities provided on the flexible driving element, a flexible driving element in the form of a strap, and a guide device with contact surfaces for locating the strap, the microswitches being associated with the contact surfaces, and the actuating means, or an intermediate element in contact with the actuating means, of at least one of the microswitches being spaced from the associated contact surface by a distance greater than the normal strap thickness but less than the overall thickness of the strap and an irregularity.

In apparatus as just referred to, the microswitches are actuated when each irregularity provided on the strap arrives between the appropriate contact surface and the actuating means, or intermediate element in contact with the actuating means, of the appropriate microswitch. As soon as the strap has travelled sufficiently far out of this region for the irregularity to become unable to depress the actuating means, the switch returns into its rest position. The instant when switching occurs is exclusively a function of the length of strap drawn in or let out. As compared with an apparatus wherein the outer periphery of the spiral constituted by the wound strap is sensed, the advantage is obtained that undesired irregularities in the formation of the spiral have no influence upon the instant when switching occurs.

The contact surfaces of the guide devices are advantageously the surfaces of the rollers. With such rollers, sliding friction between strap and contact surface is obviated and the strap is thereby preserved.

Preferably, the apparatus comprises two entry rollers which guide the strap into the guide device, and a return roller, and the actuating means of one of said microswitches contacts the strap in the region between the entry rollers and the return roller, and the actuating means of the second microswitch contacts the strap opposite the return roller, either directly or through an intermediate element. It will be clear from an exemplary embodiment which is described hereinafter that the actuating means of the first switch conveniently senses the strap directly, and the actuating means of the second switch indirectly.

For indirect sensing, the intermediate element is preferably a pivotally mounted arm which is installed between the switch actuating means and the strap. This arm is pivoted out of its normal position by the irregularity on the strap and is thus pressed against the actuating means of the microswitch.

Preferably, any irregularities on the strap extend in the longitudinal direction of the strap sufficiently far for the irregularities not to leave the actuating means during the run-down of the motor. Where such a switching apparatus is used, an especially simple overall circuit is obtained, since no self-holding contacts are required.

In a further embodiment of the invention, the flexible driving element is a strap, and the apparatus includes two microswitches for stopping the motor, respective actuating means for each microswitch, entry rollers which locate the strap, a pivotally mounted arm resiliently biased towards one microswitch, the arm carrying a return roller which bears against the strap and the arm being arranged so that it is pivoted against the bias by the tension of the strap to release the microswitch, and it is urged into contact with the microswitch to actuate the microswitch, when the strap tension is relaxed.

In such apparatus the microswitch is actuated when the strap tension is relaxed, i.e. when the roller blind has been completely let down and rests on its lower end, so that the strap is unloaded. Therefore, only one irregularity is necessary on the strap, namely the irregularity which is required to switch off the motor after raising of the blind. After lowering, the motor is switched off without the need for any irregularity in the strap, merely by the slackening of the strap tension.

In apparatus according to the present invention, the electric motor is preferably a commutator motor, having armature windings and field windings, and the apparatus comprises two alternative electrical circuits, in one of which circuits the armature windings and the field windings are connected in series in one direction and in the other of which circuits the armature windings or field windings are connected in series but with either the armature windings or the field windings reversed relative to said one direction, a double pole switch operable to complete either of the said alternative circuits, thereby causing the motor to rotate in either direction of rotation, according to which of the circuits is completed, one of said microswitches being connected in one of the alternative circuits and the other of said microswitches being connected in the other of said alternative circuits.

The microswitches then interrupt the circuit directly without the interposition of further switching elements.

Figure 2:
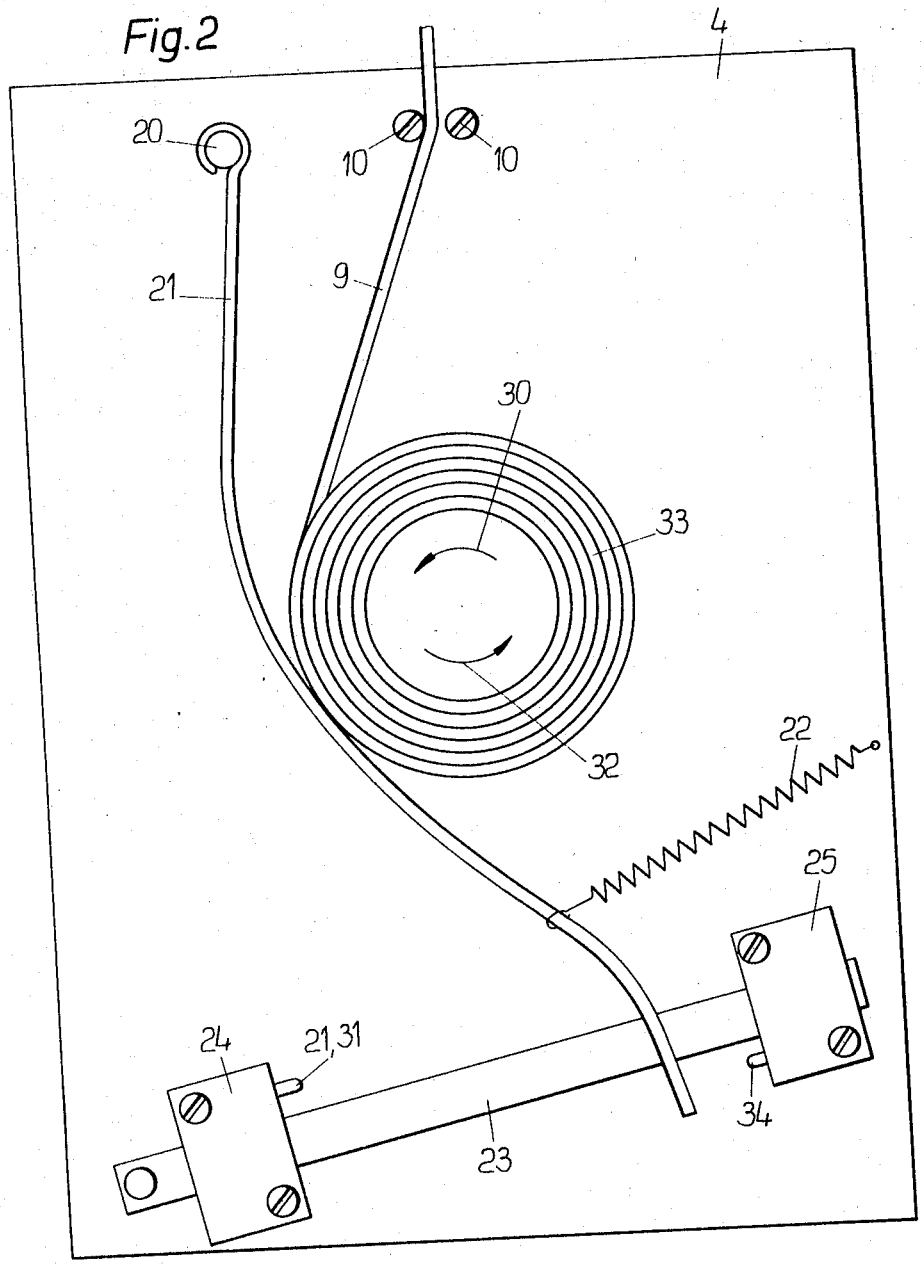
Figure 3:
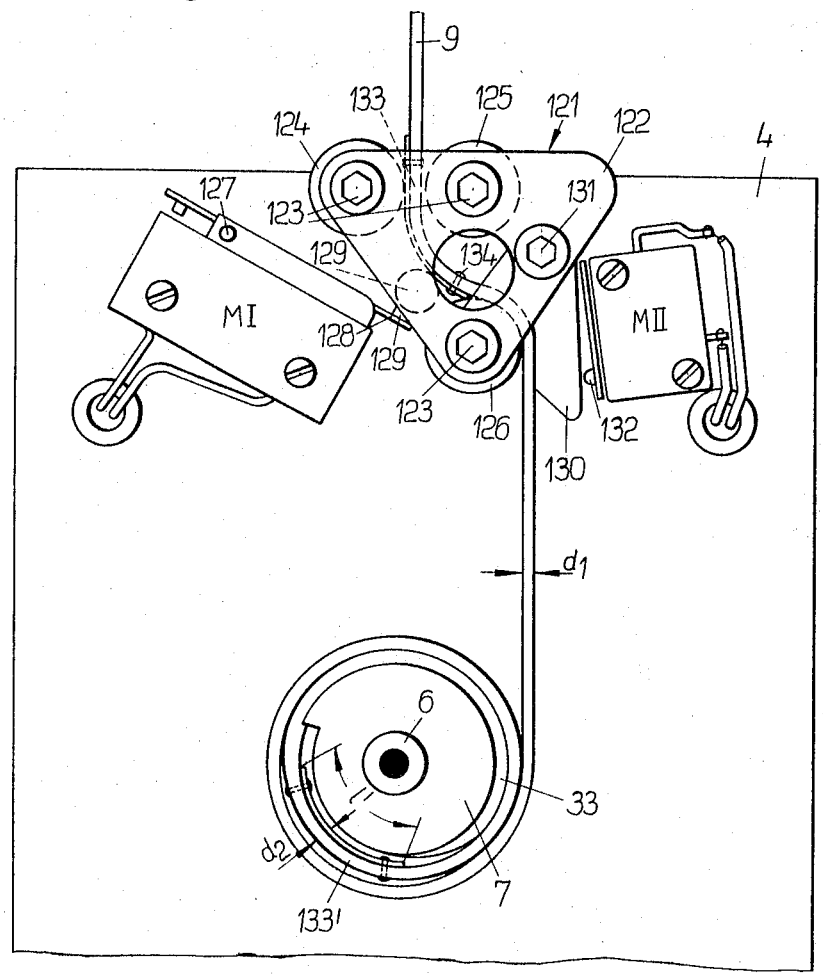
Figure 4:
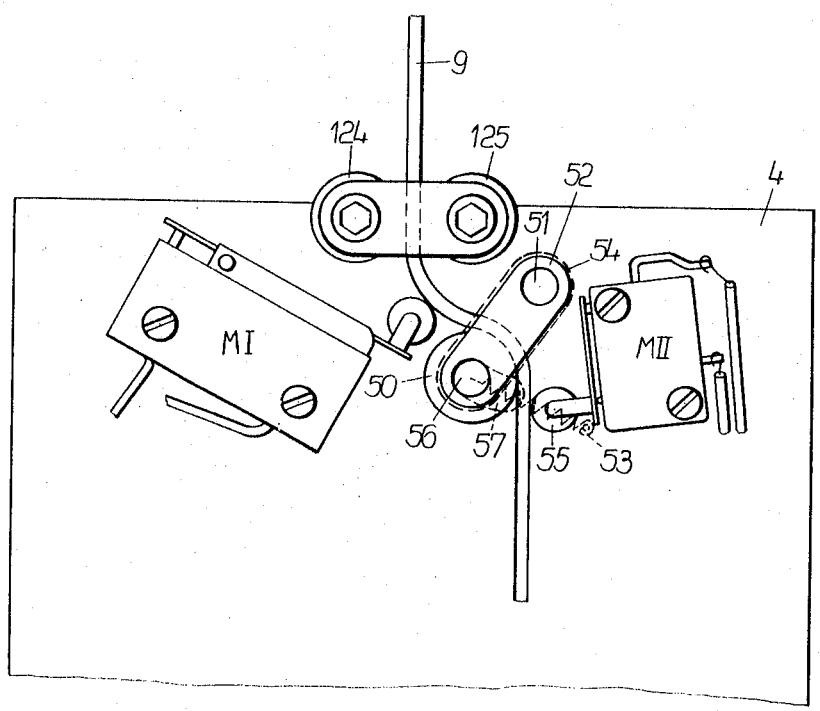
Figure 5:
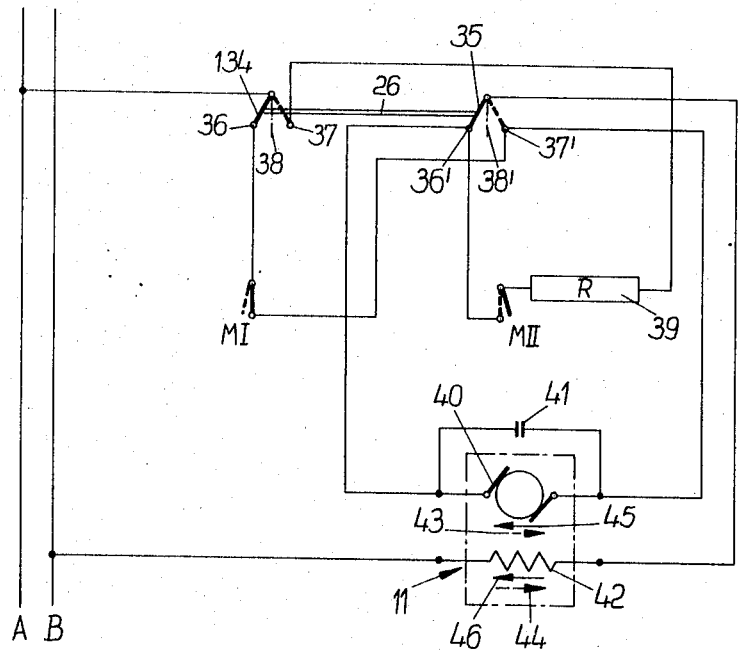

In order that the invention may be more clearly understood, some embodiments thereof will now be described, by way of example, with reference to the accompanying diagrammatic drawings, wherein:

FIG. 1 shows a vertical section through apparatus for raising and lowering blinds, such as roller blinds, constructed in accordance with the invention, FIG. 2 shows an elevation of the apparatus of FIG. 1, viewed in the direction of the arrow II, FIG. 3 shows an elevation of a switching arrangement for use in apparatus according to the invention, FIG. 4 shows an elevation of a further switching arrangement for use in apparatus according to the invention, FIG. 5 shows a circuit diagram which illustrates schematically a control circuit used in the apparatus, FIG. 6 is a perspective view of a complete blind with the raising and lowering mechanism.

The apparatus illustrated in FIG. 1 is partly let into the wall 1 of a window embrasure. The part let into the wall is accommodated in a wall chest 2 which is retained on a fixing strap 3. The fixing strap 3 is anchored in the masonry.

The apparatus is mounted on a baseplate 4 and on the baseplate 4 there is a bearing sleeve 5 in which the shaft 6 of a winding member in the form of a roller 7 is mounted. The roller 7 is normally prevented from rotating relative to the shaft 6 by a pin 8. A flexible driving element, being a traction strap 9 is wound onto the roller 7. Since the winding radius increases as the quantity of strap wound on the roller 7 increases, it is also necessary to provide guide rollers 10, the function of which is clear, more particularly from FIG. 2.

The drive of the shaft 6 and hence of the roller 7 is provided by an electric motor 11 which is mounted on a base-plate 4 by means of a fixing bracket 12. The motor 11 is of the kind which will run in either direction of rotation. The current supply is provided by a lead 17 which is connected to a terminal box 18. Cables 19 lead from the terminal box 18 to the motor terminals.

The motor shaft carries a self-locking worm which meshes with a worm wheel. The said worm gear is located in a gearbox 13 but is not shown in detail in the drawing. The end of a second shaft 14 on which the worm wheel is mounted projects out of the gearbox 13. On the said shaft 14 is mounted a pinion 15 which meshes with a gear-wheel 16. The gearwheel 16 is connected to rotate with the shaft 6.

In one practical embodiment the normal working speed of the motor 11 is 7500 revolutions per minute, the reduction ratio in the gearbox 13 is 1:32, and the step-up ratio between the pinion 15 and the gear wheel 16 is 1:7.5.

As is clearly seen from FIG. 2, sensing means in the form of a lever 21 is mounted on the baseplate 4 at 20, and the lower end of the lever is drawn towards the right hand side by means of a spring 22 in tension. The spring 22 urges the lever against the part of the strap 9 which is wound on the roller. The greater the length of strap wound on the roller, the farther is the lever 21 deflected in the clockwise direction.

Also secured to the baseplate 4 is a bar 23 upon which two microswitches 24 and 25 are slidable and to which they can be locked. On the reverse side of the baseplate 4 (see FIG. 1) is a double pole switch 26 which can be actuated by a handle 27 on switch shaft 28. The motor 11 can be switched on to run in either direction of rotation by means of the switch 26. All the parts located in front of the plate 4 are covered by means of a cover plate 29.

The apparatus operates in the following manner. It will be assumed that initially the blind is completely down, i.e. closed.

The handle 27 of the switch is appropriately actuated for raising the blind, e.g. by a righthand rotation, causing current to be switched to the electric motor 11. The latter now rotates in such a direction that the roller 7 is rotated counterclockwise (arrow 30, FIG. 2). This causes the strap 9 to be wound up onto the roller 7. The diameter of this bobbin increases, causing the sensing lever 21 to have its lower end moved towards the lefthand side. When the roller blind is completely raised, the lever 21 has travelled sufficiently far towards the left hand side to depress an actuator 31 of the microswitch 24, thereby switching off the current for the motor 11, so that the roller 7 comes to a standstill.

It is impossible for the roller blind to be unwound merely by its own weight, since the transmission 13 is self-locking and consequently locking occurs when the driving torque from the motor is stopped. Consequently, the roller blind is retained in the raised position, or in any desired intermediate position if the switch 26 is switched off at a suitable time.

In order to lower the roller blind, the knob 27 of the switch 26 is rotated towards the lefthand side, thereby causing the motor to rotate in the opposite direction, so that the roller 7 is rotated in the direction of the arrow 32. When the roller blind has arrived at the bottom of the window, the diameter of the strap bobbin 33 has decreased to such an extent that the lever 21 depresses the actuator 34 of a microswitch 25 arranged near the righthand end of bar 23. The motor is then stopped by actuator of the switch 25. FIG. 2 shows the condition when the blind is in an intermediate position, i.e. a position in which raising or lowering of the roller blind is in progress, or in which the partly open roller blind has been brought to a standstill. Adjustment of the heights at which the blind will stop after raising or lowering are easily made by sliding the microswitches 24 and 25 respectively on the bar 23 and clamping them in the correct positions. The arrangement of the microswitches to contact the free end of the lever 21 increases the sensitivity of the apparatus significantly.

In the embodiment illustrated in FIG. 1, a pin 8 is provided, for simplicity, as a coupling device between the roller 7 and its shaft 6. However, it is convenient to use any well known detachable coupling device which can be operated to release the roller 7 from the shaft 6 so that the roller 7 can be manually rotated, for example by a handle, independently of the motor, if a fault occurs, e.g. if the current fails. It will be convenient to arrange, above the place where the strap emerges from the coverplate 29, a retaining device which retains the strap if the latter becomes free from the roller 7 due to a fault. A further type of switching arrangement for apparatus according to the invention is illustrated in FIG. 3. FIG. 3 shows a plan of the baseplate 4, from the side where the roller 7 is located. The strap 9 is wound on the roller 7 to form a spiral 33. The strap 9 enters the apparatus through a guide device generally designated 121. Between a bearing plate 122, which is secured to the baseplate 4 at a distance from the latter by means of screws 123, and the baseplate 4, three rollers 124, 125 and 126 are mounted. The rollers 124 and 125 are entry rollers which guide the strap 9 into the guide device 121, and the roller 126 deflects the strap before it arrives on the roller 7. On the lefthand side below the guide device 121 is a microswitch MI. The microswitch 121 is operated by actuating means 128 mounted at 127. A roller 129 made of plastics material is mounted at the end of the actuating means 128 as a sensing element.

An arm 130 is pivotally mounted at 131 between the bearing plate 122 and the baseplate 4.

The arm 130 forms an intermediate element between the strap 9 and actuating means 132 on the microswitch MII.

A strip 133, which is preferably of leather, is secured to one side of the strap 9 by means of rivets 134. On the side of the strap a similar strip 133 is fastened. The strip 133 is shown in FIG. 3 as being within the spiral 120. The actuating means 128 of switch MI is so located that it is not depressed until it is contacted by the strip 133. The intermediate element 130 s normally spaced from the roller 126 by a distance greater than the normal strap thickness but less than the overall thickness of the strap and the strip 133, so that the element 130 is displaced to actuate switch MII by the arrival of the strip 133 between roller 126 and element 130.

Referring to FIG. 5, the double pole rotary switch shown schematically at 26 has two contact strips which are switched simultaneously due to the mechanical construction of the switch. The two switch strips are designated 134 and 35. They can be brought into contact either with the poles 36, 36' located on the lefthand side in the diagram, or with the poles 37, 37' located on the righthand side. The central open position 38, 38', shown by chain-dotted lines, in which none of the poles is touched, is also possible. The switch strip 134 is conductively connected to the pole A of the main supply A, B. A commutator motor is indicated generally at 11 in the circuit diagram of FIG. 5.

Referring to FIG. 5, the apparatus operates in the following way. Let the position illustrated in FIG. 3 be assumed to be the starting position. In this position the strap 9 is totally retracted. The strip 133 has opened the microswitch MI, as illustrated by a broken line in FIG. 5. No pressure is exerted upon the actuating means 132 of the switch MII. The switch 132 is thus closed as shown by a broken line in FIG. 5.

The manual switch 26 is then moved from its rest position 38, 38', shown by chain-dotted lines, into the position 37, 37' shown by broken lines, thereby completing one of two alternative circuits. It will be seen that the current is then able to flow from the mains pole A via the contact strip 134 to the pole 37, and thence to the resistance 39 and through the closed microswitch MII and the pole 36' and brush 40 to the armature 41 of the motor 11. From the armature 41 the current flows to the pole 37' and through the contact strip 35 shown by a broken line to the field winding 42 of the commutator motor 11, and thence back to the mains pole B. Thus the armature windings 41 and the field windings 42 are in series. The current direction in the armature 41 is illustrated by the broken arrow 43 and the current direction in the field winding 42 by the broken arrow 44. The arrows are oriented in opposite directions. In this switching condition the resistance 39 is placed in the armature circuit.

Thus the motor 11 is started, and its direction of rotation is such that the strap 9 is unwound from the roller 7 by the weight of the roller blind. The motor 11 is not therefore required to transmit any force to the strap, but merely has the function of overcoming the self-locking action of the gearbox 13. The power delivered by the motor is greatly reduced as compared with the maximum power of the motor power, due to the fact that the motor 11 is constructed primarily for the opposite direction of rotation and that the resistance 39 is placed in the armature circuit, but the power delivered is sufficient for lowering the blind. The circuit according to the invention as shown in FIG. 5, has the advantage that, despite the use of a motor which is designed primarily for one direction of rotation, starting at the commutator is obviated in the case of the direction of rotation described. It is therefore possible to use a small motor.

When the strap 9 has been let out sufficiently for the roller blind, or the like, to have reached its full position of closure, the strip 133' makes contact with the arm 130, causing the actuating means 132 to be depressed and the microswitch MII to be opened. It is clear from the circuit diagram that the motor supply circuit is then interrupted and so the motor and the drive come to rest. The length 1' of the strip 133' is sufficiently great for the strip to remain in contact with the arm 130 during the run-down of the motor, so that the switch MII cannot be closed again.

It is only possible for the drive to be switched on again by the rotary switch 26 being turned beyond the central position 38, 38' into the position shown in continuous lines, thereby completing the second of the two alternative circuits to cause rotation of the motor in the opposite direction, as follows. The path of the current is: mains pole A, contact strip 134, pole 36, closed microswitch MI, armature 41, brush 40, pole 36', contact strip 35, field winding 42, mains pole B. The current thus flows in the armature in the direction of the continuous line arrow 45, and in the field winding in the direction of the continuous line arrow 46. The two current directions are therefore the same, and the motor therefore rotates in the opposite direction, so as to raise the blind. It will be seen that athough in the second alternative circuit the armature and field windings 41 and 42 are still in series, the direction of connection of the armature windings has been reverted relative to its direction in the first circuit.

The resistance 39 is no longer in the armature circuit and the motor 11 therefore delivers its full power and is able, despite its small overall size, to transmit considerable power to the roller 7, so that heavy roller blinds and roller shutters can be raised by a small motor. The running of the motor is interrupted when the strap has been drawn in sufficiently for the strip 133 to open the microswitch MI. The current through the armature 141 is thus interrupted as is clear from the circuit diagram of FIG. 5.

It is possible for the strap to be stopped in any desired position between the two end positions by moving the switch 26 to the central position 38, 38', shown by chain-dotted lines.

In the switching arrangement shown in FIG. 4, two entry rollers 124 and 125 are again provided for the strap entry, and microswitches MI and MII, which are connected into an electrical circuit as shown in FIG. 5, co-operate with the strap 1. Instead of the fixedly mounted deflector roller used in the embodiment of FIG. 3, however, a return roller 50 is provided which is rotatably mounted at the end of an arm 52 pivotally mounted on the baseplate 4 at 51. The arm 52 is biased in an anti-clockwise direction as viewed in FIG. 4, by means of a bias spring 53 arranged on the reverse side of the plate and connected to a lever 54 mouted on the same pivot 51 as the arm 52. The actuating means 55 of the microswitch MII is placed opposite the return roller 50. The actuating means 55 is constructed in the same way as the actuating means of the microswitch MI in the embodiment shown in FIG. 3, i.e. including a small plastic roller.

The switching arrangement shown in FIG. 4 operates in the following manner. When the strap 9 is fully drawn in, i.e. when the blind is in the raised position, an irregularity on the strap co-operates with the microswitch MI in the same manner as has been described with reference to FIG. 3, to stop the motor 11.

After the roller blind has been completely lowered, the lower edge of the blind comes to rest on the lower part of the window embrasure, so that the weight of the blind is now supported by its lower edge and not by the strap 9. The strap 9 is therefore relaxed and the tension of the spring 53 is able to pivot the arm 52 anti-clockwise, thereby pressing the loose strap against the actuating means 55 o fthe microswitch MII to open the switch MII, thereby stopping the motor 11.

When the motor 11 is operated to tighten the strap 9, and raise the blind, the tension of the strap 9 overcomes the tension of the spring 53 so that the arm 52 is pivoted clockwise. The pivotal movement of arm 52 in this direction is limited by the bearing bolt 56 of the roller 50 contacting the end of a slot 57 provided in the baseplate 4. The clockwise pivotal movement of the arm 52, together with the strap 9, releases the actuating means 55 thereby closing the microswitch MII.

Referring now to FIG. 6, there is shown thereon a complete blind installation in which the blind itself is indicated by reference character 302. This blind is supported by straps 302 connected at the lower end to the blind 302 and at the upper end secured on the winding cylinder 301. The winding cylinder has a pulley or roller 300 at one end to which is secured strap 9 and the latter can be wound thereon. The winding cylinder 301 and the drum 300 is mounted in a bearing 200 and the strap 9 enters at the lower end the control and operating device 100. It is obvious that to raise the blind 300, the motor in the mechanism 100 is actuated to take in the strap 9 which will rotate the drum 300 on cylinder 301 and when the blind is to be released, the pull of gravity on the blind will lower it without any difficulty.

We claim:

1. Apparatus for raising and lowering a blind of the type which is controlled from a rotatable cylinder, comprising a rotatable winding element mounted remotely from the cylinder, an electric motor connected to operate the winding element, a strap connected to and extending between the cylinder and the winding element and which when wound on to the winding element will cause rotation of the cylinder when the electric motor is oprated to raise the blind, the motor and the winding element being disposed beneath the blind cylinder, an electrical control circuit for the motor including at least one microswitch, and sensing means which senses the amount of the flexible driving element wound on the winding element, the sensing means being operatively associated with the microswitch to actuate the latter, thereby stopping the motor, when the blind reaches a predetermined position.

2. Apparatus according to claim 1, in which the motor and the winding element are at least partly accommodated in a wall chest in a wall.

3. Apparatus according to claim 1, in which the motor and the winding element are mounted on a baseplate which can be secured within a wall chest after the latter has been installed.

4. Apparatus according to claim 1, in which a drive shaft is provided on which the winding element is mounted, and in which detachable means is provided for connecting the winding element with the drive shaft so as to allow manual rotation of the winding element independently of the motor.

5. Apparatus according to claim 1, in which two microswitches are provided, the sensing means is a lever which is urged resiliently against the part of the strap wound on the winding element, and each microswitch being located at a predetermined position relative to the sensing lever, and slidable on a bar to which it can be locked.

6. Apparatus according to claim 1, comprising two microswitches for switching off the motor, respective actuating means for each microswitch, and two irregularities so positioned on the flexible driving element, as to be sensed by and to operate the respective actuating means when the blind is fully raised and when the blind is fully lowered.

7. Apparatus according to claim 1, comprising two microswitches, a guide device with contact surfaces for locating the strap, the microswitches being associated with the contact surfaces, and the actuating means being in contact with the guide device, of at least one of the microswitches being spaced from the associated contact surface by a distance greater than the normal strap thickness but less than the overall thickness of the strap and an irregularity.

8. Apparatus according to claim 7, characterised in that the contact surfaces of the guide device are the surfaces of rollers.

9. Apparatus according to claim 1, comprising two microswitches, two entry rollers which guide the strap into the guide device, and a return roller, and wherein the actuating means of one of said microswitches contacts the strap in the region between the entry rollers and the return roller, and the actuating means of the second microswitch contacts the strap opposite the return roller, either directly or through an intermediate element.

10. Apparatus according to claim 7, in which the intermediate element is a pivotally mounted arm.

11. Apparatus according to claim 6, in which the irregularities extend in the longitudinal direction of the strap sufficiently far for the irregularities not to leave the actuating means during the run-down of the motor.

12. Apparatus according to claim 1, including two microswitches for stopping the motor, respective actuating means for each microswitch, entry rollers which locate the strap, a pivotally mounted arm resiliently biased towards one microswitch, the arm carrying a return roller which bears against the strap and the arm being arranged so that it is pivoted against the bias by the tension of the strap to release the microswitch, and it is urged into contact with the microswitch to actuate the microswitch, when the strap tension is relaxed.

References Cited

UNITED STATES PATENTS

| | | | |
|---|---|---|---|
| 1,652,566 | 12/1927 | Emig | 160—310 |
| 2,463,176 | 3/1949 | Hogrefe. | |
| 2,466,103 | 4/1949 | Hiester | 160—310 |
| 2,848,064 | 8/1958 | Gregory | 160—310 |

FOREIGN PATENTS

| | | |
|---|---|---|
| 373,788 | 3/1907 | France. |
| 139,330 | 11/1934 | Germany. |
| 197,356 | 10/1907 | Germany. |

EVON C. BLUNK, *Primary Examiner.*

H. C. HORNSBY, *Assistant Examiner.*